(12) United States Patent
Annampedu (10) Patent No.: US 7,499,238 B2
(45) Date of Patent: Mar. 3, 2009

(54) SYSTEMS AND METHODS FOR IMPROVING DISK DRIVE SYNCHRONIZATION

(75) Inventor: Viswanath Annampedu, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 69 days.

(21) Appl. No.: 11/534,265

(22) Filed: Sep. 22, 2006

(65) Prior Publication Data
US 2008/0074778 A1    Mar. 27, 2008

(51) Int. Cl.
G11B 21/02 (2006.01)
G11B 5/596 (2006.01)
G11B 5/09 (2006.01)

(52) U.S. Cl. .................. 360/75; 360/77.04; 360/77.08; 360/51

(58) Field of Classification Search ........................ None
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 5,278,703 A * | 1/1994 | Rub et al. | 360/51 |
| 5,341,249 A | 8/1994 | Abbott et al. | |
| 5,523,902 A * | 6/1996 | Pederson | 360/77.08 |
| 5,798,885 A | 8/1998 | Saiki et al. | |
| 5,844,920 A | 12/1998 | Zook et al. | |
| 5,852,524 A | 12/1998 | Glover et al. | |
| 6,009,549 A | 12/1999 | Bliss et al. | |
| 6,278,591 B1 | 8/2001 | Chang | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,603,622 B1 | 8/2003 | Christiansen et al. | |
| 6,646,822 B1 | 11/2003 | Tuttle et al. | |
| 6,813,108 B2 | 11/2004 | Annampedu et al. | |
| 6,856,183 B2 | 2/2005 | Annampedu | |
| 6,912,099 B2 | 6/2005 | Annampedu et al. | |

(Continued)

OTHER PUBLICATIONS

Annampedu, et al., "Adaptive Algorithms for Asynchronous Detection of Coded Servo Signal Based on Interpolation," IEEE Trans. on Magnetics, vol. 41, No. 10, Oct. 2005.

*Primary Examiner*—K. Wong
(74) *Attorney, Agent, or Firm*—Hamilton, DeSanctis & Cha (57) ABSTRACT

Various systems and methods for providing head location feedback are disclosed herein. For example, one system includes an interface circuit that is operable to receive an information stream retrieved from a magnetic storage medium. The magnetic storage medium includes one or more tracks that each include a plurality of sectors. The sectors include burst information that can be utilized to aid in positioning a read/write head assembly over a magnetic storage medium. The systems further include a multiple sector error detection circuit. The multiple sector error correction circuit is operable to phase align samples of a burst obtained from one sector with samples of a burst obtained from another sector. An amplitude of each of the bursts is determined, and the determined amplitudes are combined. The combined amplitudes correspond to a position error of the read/write head assembly relative to the magnetic storage medium. In some cases, the devices further include a motor controller that is operable to receive the combination of the amplitudes and to cause the head assembly to move relative to the magnetic storage medium by an amount corresponding to the position error.

21 Claims, 6 Drawing Sheets

U.S. PATENT DOCUMENTS

| | | |
|---|---|---|
| 6,963,521 B2 | 11/2005 | Hayashi |
| 6,999,257 B2 | 2/2006 | Takeo |
| 6,999,264 B2 | 2/2006 | Ehrlich |
| 7,002,767 B2 | 2/2006 | Annampedu et al. |
| 7,072,137 B2 * | 7/2006 | Chiba ..................... 360/77.06 |
| 7,082,005 B2 | 7/2006 | Annampedu et al. |
| 7,092,462 B2 | 8/2006 | Annampedu et al. |
| 7,167,328 B2 | 1/2007 | Annampedu et al. |
| 7,180,693 B2 | 2/2007 | Annampedu et al. |
| 7,191,382 B2 * | 3/2007 | James et al. ................ 714/769 |
| 7,193,798 B2 | 3/2007 | Byrd et al. |
| 7,206,146 B2 | 4/2007 | Flynn et al. |
| 7,411,531 B2 | 8/2008 | Aziz et al. |
| 7,423,827 B2 | 9/2008 | Neville et al. |
| 2002/0150179 A1 | 10/2002 | Leis et al. |
| 2003/0095350 A1 | 5/2003 | Annampedu et al. |
| 2005/0157415 A1 | 7/2005 | Chiang |

* cited by examiner

SYSTEMS AND METHODS FOR IMPROVING DISK DRIVE SYNCHRONIZATION

BACKGROUND OF THE INVENTION

The present invention is related to storage media. More particularly, the present invention is related to systems and methods for synchronizing to information maintained on a storage medium.

A typical digital magnetic storage medium includes a number of storage locations where digital data may be stored. Data is written to the medium by positioning a read/write head assembly over the medium at a selected location, and subsequently passing a modulated electric current through the head assembly such that a corresponding magnetic flux pattern is induced in the storage medium. To retrieve the stored data, the head assembly is positioned anew over the track. In this position, the previously stored magnetic flux pattern induces a current in the head assembly that can be converted to the previously recorded digital data.

Figure 1:
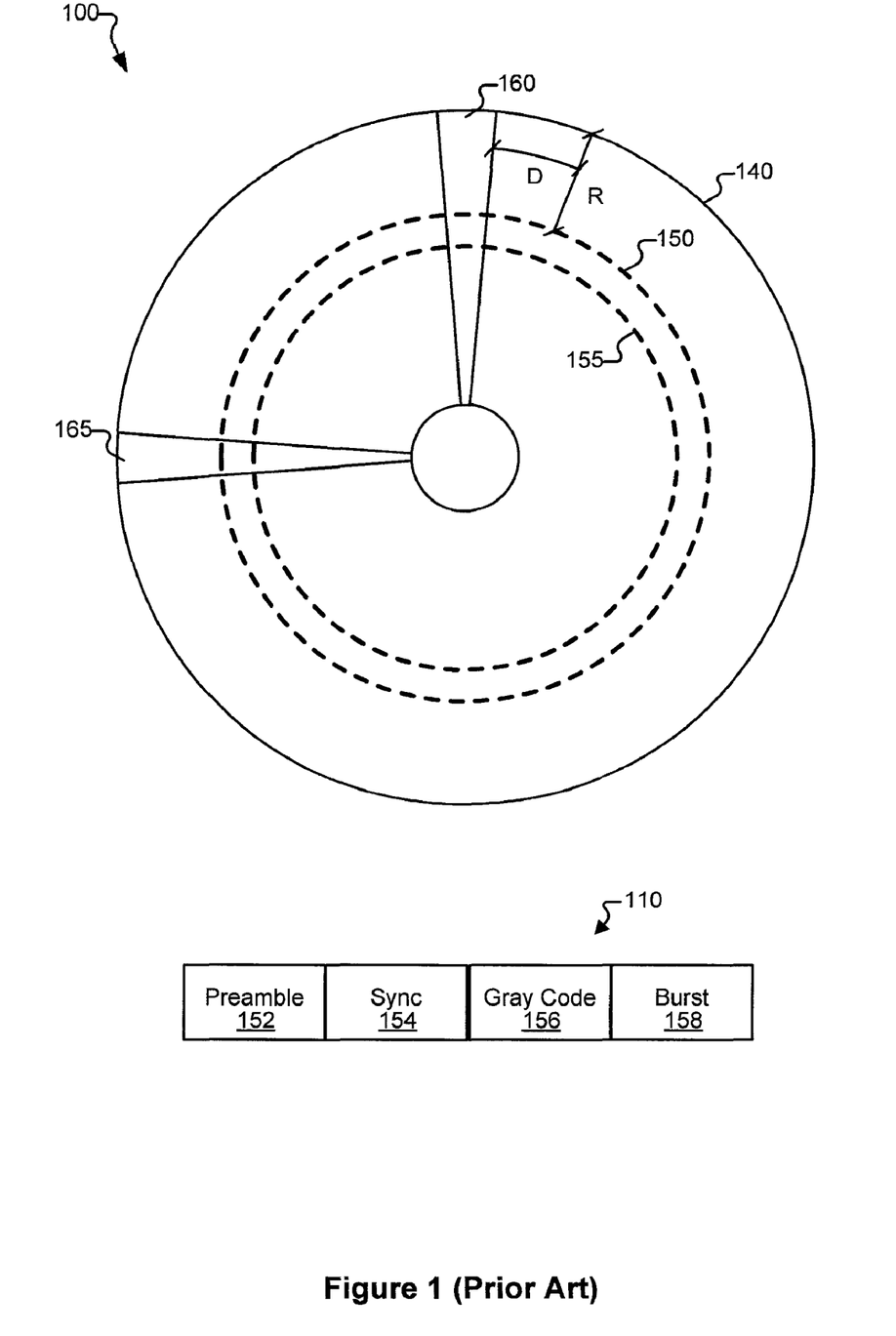
FIG. 1 is a block diagram of a known magnetic storage medium and sector data scheme.

The storage locations on the magnetic storage medium are typically arranged as a serial pattern along concentric circles known as tracks. FIG. 1 shows a storage medium 100 with two exemplary tracks 150, 155 as dashed lines. The tracks are segregated by servo data written within wedges 160, 165. These wedges include data and supporting bit patterns that are used for control and synchronization of the head assembly over a desired storage location on storage medium 100. The data and supporting bit patterns used to derive the control and synchronization is depicted as a pattern 110 that includes a preamble 152, a sync 154, a gray code 156 and a burst 158. It should be noted that while two tracks and two wedges are shown, hundreds of each would typically be included on a given storage medium. Further, it should be noted that a sector may have two or more bursts.

Burst 158 includes one or more sinusoidal signals that can be used to determine radial position of the head assembly relative to the track. In a traditional scenario, burst 158 is detected within a given sector and used to determine radial position of the head assembly relative to the track. Once radial position is determined, the head assembly is immediately moved to compensate for any positioning error. In various cases, however, noise or other factors affect the information obtained from burst 158. At times, this can result in inaccuracies in positioning the head assembly.

Hence, for at least the aforementioned reasons, there exists a need in the art for advanced systems and methods for increasing the accuracy of head assembly positioning.

BRIEF SUMMARY OF THE INVENTION

The present invention is related to storage media. More particularly, the present invention is related to systems and methods for synchronizing to information maintained on a storage medium.

Various embodiments of the present invention provide head location feedback devices. Such devices include an interface circuit that is operable to receive an information stream retrieved from a magnetic storage medium. The magnetic storage medium includes one or more tracks that each include a plurality of sectors. The sectors include burst information that can be utilized to aid in positioning a read/write head assembly over a magnetic storage medium. The devices further include a multiple sector error detection circuit. The multiple sector error correction circuit is operable to phase align samples of a burst obtained from one sector with samples of a burst obtained from another sector. An amplitude of each of the bursts is determined, and the determined amplitudes are combined. The combined amplitudes correspond to a position error of the read/write head assembly relative to the magnetic storage medium. In some cases, the devices further include a motor controller that is operable to receive the combination of the amplitudes and to cause the head assembly to move relative to the magnetic storage medium by an amount corresponding to the position error.

Other embodiments of the present invention provide methods for positioning a read/write head assembly in relation to a magnetic storage medium. Such methods include providing a magnetic storage medium that includes at least one track with at least a first sector and a second sector associated with the track. The first and second sectors are identified and a first information set from the first sector and a second information set from the second sector is sampled. A subset of the first information set is stored, and a subset of the second information set is correlated with that of the first information set. The subset of the first information set is combined with the subset of the second information set to yield an indication of a location of the read/write head assembly relative to the magnetic storage medium.

In some instances of the aforementioned embodiments, the methods further include moving the read/write head assembly a distance and direction corresponding to the indication of the location. In various cases, the first sector includes a preamble and a sync, and identifying the first sector includes detecting at least one of the preamble and the sync. In some cases, the first sector includes a first burst and the second sector includes a second burst. In such cases, sampling the first information set includes sampling an amplitude of the first burst and sampling the second information set includes sampling an amplitude of the second burst. In particular instances of the aforementioned cases, an indication of the location of the read/write head assembly relative to the magnetic storage medium is associated with the amplitude of the first burst, and another indication of the location of the read/write head assembly is associated with the second burst. In various instances of the aforementioned cases, combining the subset of the first information set with the subset of the second information set includes summing the amplitude of the first burst with the amplitude of the second burst. In various other instances of the aforementioned cases, correlating the subset of the second information set with the subset of the first information set includes aligning the phase of the second burst with the phase of the first burst.

In some cases of the aforementioned embodiments, correlating the subset of the second information set with the subset of the first information set includes a more generic alignment of the phase of the subset of the second information set with the phase of the subset of the first information set. In some instances, the first sector includes a first gray code and the second sector includes a second gray code. In such cases, sampling the first information set may include sampling the first gray code, and sampling the second information set may include sampling the second gray code. In various cases, the magnetic storage medium further includes at least a third sector associated with the track. In such cases, the method may further comprise: storing the subset of the second information set; identifying the third sector; sampling a third information set retrieved from the third sector; correlating a subset of the third information set with the subset of the first information set and the subset of the second information set; and combining the subset of the third information set with the combination of the subset of the first information set and the subset of the second information set to yield the indication of the location of the read/write head assembly relative to the magnetic storage medium.

Yet other embodiments of the present invention provide systems for governing the position of a read/write head assembly in relation to a magnetic storage medium. Such systems include an interface circuit and a multiple sector error detection circuit. The interface circuit is operable to receive an information stream retrieved from a magnetic storage medium that includes at least one track with at least a first sector and a second sector associated with the track. The multiple sector error correction circuit is operable to receive information from the interface circuit representing at least the first sector and the second sector, and wherein the multiple sector error detection circuit is operable to combine the information from the first sector with the information from the second sector to create an indication of a head assembly location relative to the magnetic storage medium.

In some cases, the aforementioned systems further include a motor controller that is operable to receive the indication of the head assembly location relative to the magnetic storage medium, and to cause the head assembly to move relative to the magnetic storage medium an amount based at least in part on the indication of the head assembly location relative to the magnetic storage medium. Where, for example, the indication of the head assembly location relative to the magnetic storage medium is an indication of an error distance from a desired location, the system may include a motor controller that is operable to receive the indication of the head assembly location relative to the magnetic storage medium, and to cause the head assembly to move relative to the magnetic storage medium an amount designed to reduce the error distance.

In some cases of the aforementioned embodiments, the first sector includes a preamble and a sync. In such cases, identifying the first sector may include detecting at least one of the preamble and the sync. In cases where the first sector includes a first burst and the second sector includes a second burst, receiving information from the interface circuit representing at least the first sector and the second sector may include receiving a sample of the first burst and a sample of the second burst. In such cases, the multiple sector detector circuit may be operable to determine a first amplitude of the sample of the first burst and second amplitude of the sample of the second burst. In such cases, combining the information from the first sector with the information from the second sector may include summing the first amplitude and the second amplitude. In other such cases, combining the information from the first sector with the information from the second sector may include averaging the first amplitude and the second amplitude. In some instances of the aforementioned cases, the multiple sector detector circuit is further operable to align the phase of the sample of the first burst with the sample of the second burst of information.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to storage media. More particularly, the present invention is related to systems and methods for synchronizing to information maintained on a storage medium.

Various embodiments of the present invention provide head location feedback devices. Such devices include an interface circuit that is operable to receive an information stream retrieved from a magnetic storage medium. As used herein, the phrase "information stream" is used in its broadest form to mean any series of data provided one or more bits at a time. Thus, for example, an information stream may be, but is not limited to, a series of information bits retrieved from a magnetic storage medium. Further, as used herein, the phrase "magnetic storage medium" is used in its broadest sense to mean any storage medium where information is represented or accessed using a magnetic field. Thus, for example, a magnetic storage medium may be, but is not limited to, a hard disk drive media.

In the systems, the magnetic storage medium includes one or more tracks that each include a plurality of sectors. Such tracks may include a variety of information including, but not limited to, user data and control data. The sectors may include burst information that can be utilized to aid in positioning a read/write head assembly over a magnetic storage medium. In addition, the sectors may include other information such as, for example, a preamble, a sync and a gray code. As used herein, the phrase "read/write head assembly" is used in its broadest sense to mean any device capable or writing and/or reading data to and/or from a magnetic storage medium. As used herein, the phrase "burst information" is used in its broadest sense to mean any information that can be accessed and used to indicate the location of a read/write head in relation to a track. Thus, for example, the burst information may be, but is not limited, one or more sine waves written to the magnetic storage medium. The sine waves can be accessed from the magnetic storage medium, and the magnitude of the accessed sine wave indicating the location of the read/write head relative to the center of the track on which the burst information is written.

The devices further include a multiple sector error detection circuit. As used herein, the phrase "multiple sector error correction circuit" without further qualification is used in its broadest sense to mean any circuit capable of utilizing information from two or more sectors to detect and/or correct data. In some embodiments of the present invention, the multiple sector error correction circuit is qualified as being operable to phase align samples of a burst obtained from one sector with samples of a burst obtained from another sector. An amplitude of each of the bursts is determined, and the determined amplitudes are combined. As used herein the terms "combine" and "combining" are used in their broadest sense to mean any use of two or more component parts to arrive at a particular result. Thus, as just one of many examples, combining two amplitude measurements may include, but is not limited to, averaging the two amplitude measurements or adding the two amplitude measurements. The combined amplitudes correspond to a position error of the read/write head assembly relative to the magnetic storage medium. In some cases, the devices further include a motor controller that is operable to receive the combination of the amplitudes and to cause the read/write head assembly to move relative to the magnetic storage medium by an amount corresponding to the position error. As used herein, the phrase "position error" is used in its broadest sense to mean any deviation from a desired location. Thus, for example, a position error may be, but is not limited to, a distance from the center of a track as indicated by the burst information. As another example, a position error may be the combination of a distance and a direction from the center of a track as indicated by the burst information.

Figure 2A:
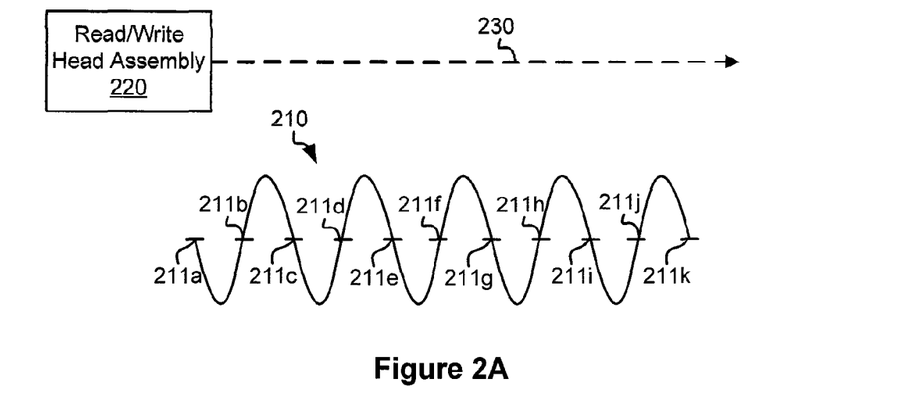
FIGS. 2a-2c depict position error information obtained from a simplified scenario including a read/write head assembly positioned relative to a particular sine wave.
Figure 2B:
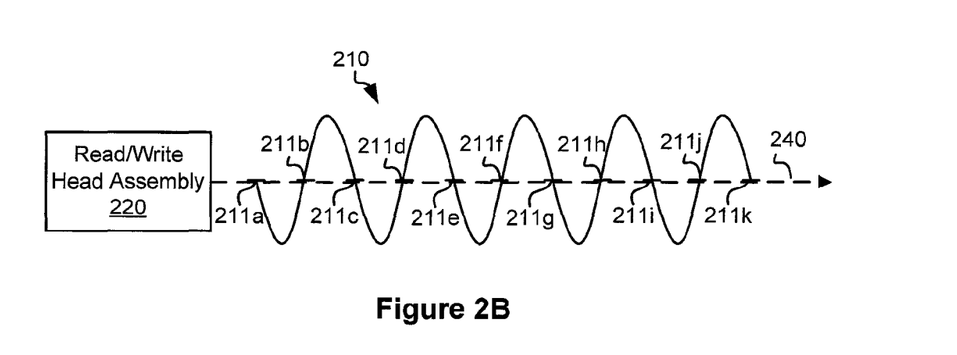
Figure 2C:
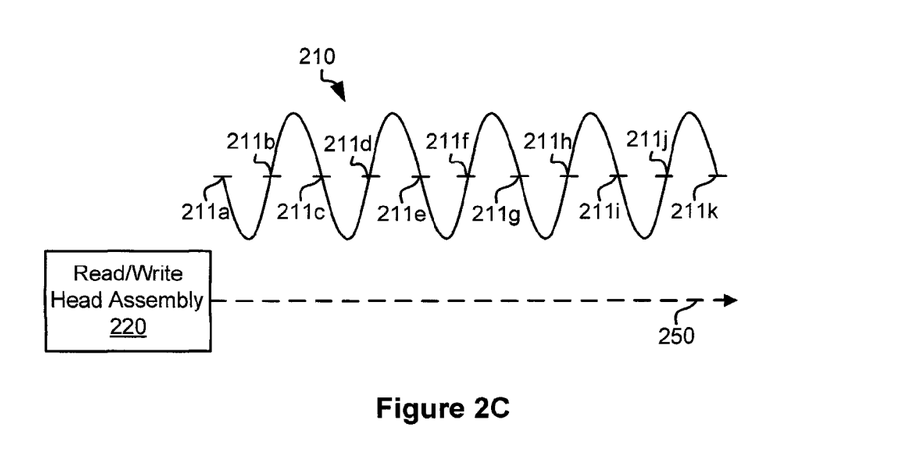

Turning to FIG. 2, a simplified example of determining position error information by detecting a sine wave with a read/write head assembly is depicted. It should be noted that the depictions of FIG. 2 are provided for explanation purposes only, and that one of ordinary skill in the art will recognize approaches well known in the art for detecting a distance and direction away from a track center using one or more sine waves written as burst information within sectors of a magnetic storage medium. FIG. 2a shows a sine wave 210 that is written as sector information with the zero crossings 211 coincident with the center of the particular track. In the case of FIG. 2a, a read/right head assembly 220 is positioned left of the track center as indicated by a dashed line 230. In this situation, the detected amplitude of sine wave 210 is reduced by the distance of path 230 to zero crossings 211. In contrast, FIG. 2b shows by read/write head assembly 220 traversing a path 240 that is substantially coextensive with the track center as indicated by zero crossings 211. In this situation, the detected amplitude of sine wave 210 is greater than that of FIG. 2a because of the proximity of path 240 to the track center. As the other example, FIG. 2c shows a situation where a read/right head assembly 220 is positioned right of the track center as indicated by a dashed line 250. Again, because of the distance between path 250 and zero crossings 211, the amplitude of sine wave 210 detected by read/write head assembly 220 is somewhat attenuated when compared with the situation of FIG. 2b. Again, as is well known in the art, this simplified example may be extended to provide both an indication of a distance between the traversal path (i.e., 230, 240, 250) of read/write head assembly 220 and the track center (represented by zero crossings 211), and the direction which the traversal path is offset from the track center.

Figure 3:
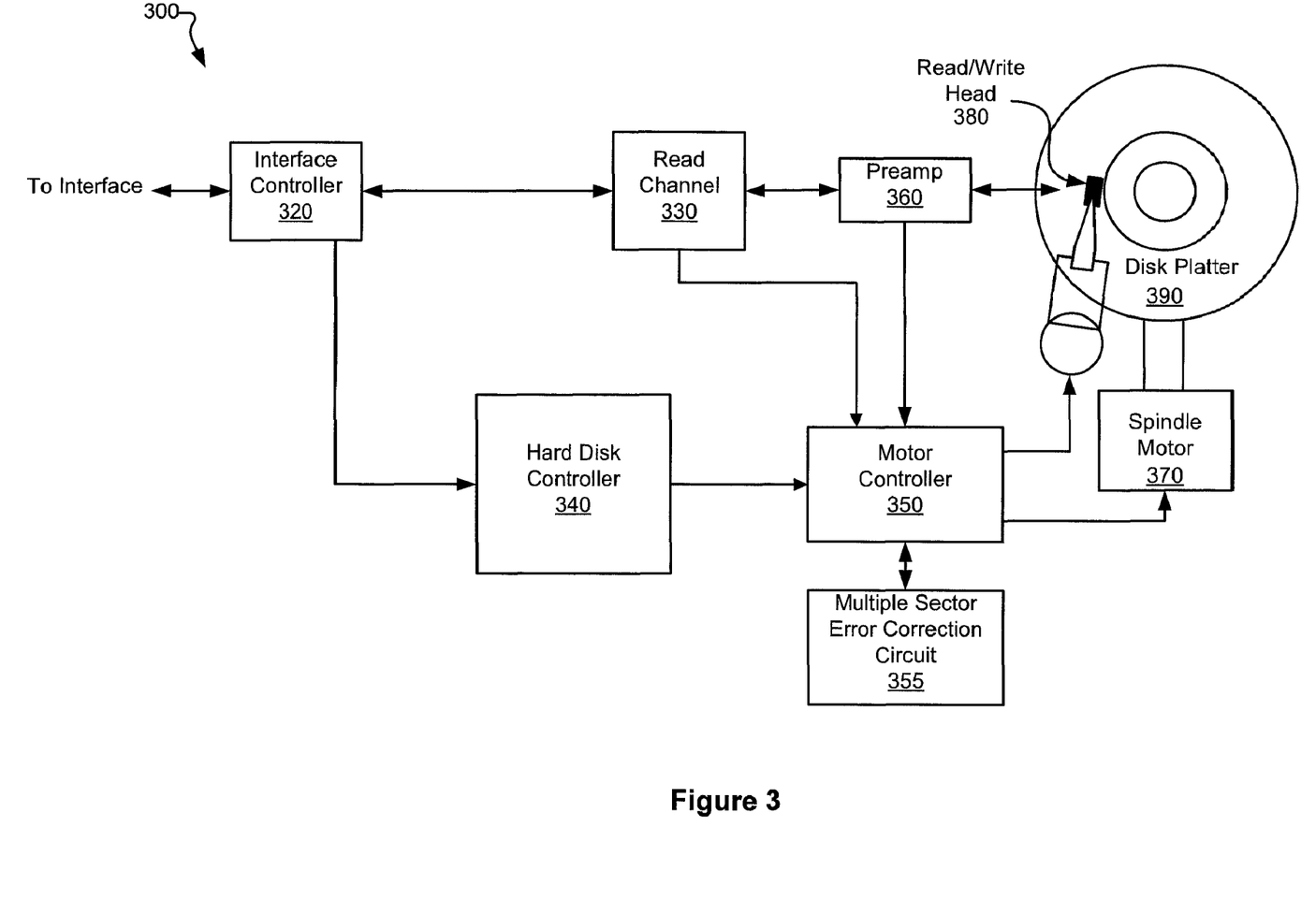
FIG. 3 depicts a hard disk drive system including a head assembly positioning system in accordance with some embodiments of the present invention.

Turning to FIG. 3, a hard disk drive system 300 including a head assembly positioning system is depicted in accordance with some embodiments of the present invention. Hard disk drive system 300 includes a number of components that are well known in the art including an interface controller 320, a read channel module 330, a hard disk controller 340, a preamp 360, a spindle motor 370, a read/write head assembly 380, and a disk platter 390. In addition, hard disk drive system 300 includes combination of a motor controller 350 and a multiple sector error correction circuit 355 that is capable of accurately determining the position of read/write head assembly 380, and accurately positioning read/write head assembly 380 relative to disk platter 390.

Interface controller 320 may be any interface tailored to allow commands to pass to and/or from a host controller. Thus, interface controller 320 may be, but is not limited to, an ATA interface controller, an SATA interface controller, an MMC interface controller, a CE-ATA interface controller, or an SDIO interface controller. Based on the disclosure provided herein, one of ordinary skill in the art will recognize a variety of interface controllers that may be implemented in relation to one or more embodiments of the present invention.

The data on disk platter 390 consists of groups of magnetic signals that may be detected by read/write head assembly 380 when the assembly is properly positioned over disk platter 390. In a typical read operation, read/write head assembly 380 is generally positioned by motor controller 350 over a desired data track on disk platter 390. Motor controller 350 both positions read/write head assembly 380 in relation to disk platter 390 and drives spindle motor 370 by moving read/write head assembly to the proper data track on disk platter 390 under the direction of hard disk controller 340. Spindle motor 370 spins disk platter 390 at a determined spin rate (RPMs).

Once read/write head assembly 390 is generally positioned adjacent the proper data track, magnetic signals representing data on disk platter 390 are sensed by read/write head assembly 380 as disk platter 390 is rotated by spindle motor 370. The sensed magnetic signals are provided as a continuous, minute analog signal representative of the magnetic data on disk platter 390. This minute analog signal is transferred from read/write head assembly 380 to read channel module 330 via preamp 360. Preamp 360 is operable to amplify the minute analog signals accessed from disk platter 390. In addition, preamp 360 is operable to amplify data from read channel module 330 that is destined to be written to disk platter 390. In turn, read channel module 330 digitizes the received analog signal to recreate the digital data originally written to disk platter 390. The digitized data is provided via interface controller 320 to a host computer or device governing operation of hard disk drive system 300.

A write operation is substantially the opposite of the preceding read operation with digital data being received from a host via interface controller 320. The digital data is provided to read channel module 330 and to hard disk controller 340. Hard disk controller 340 commands the proper positioning of read/write head assembly 380 adjacent a particular data track on data platter 390 and the desired rotational speed of disk platter 390 via motor controller 350. Once the aforementioned commands are implemented, the digital data is converted to an analog data stream by read channel module 330 and provided to read/write head assembly via preamp 360. In turn, read/write head assembly 380 writes the data to disk platter 390.

In a conventional disk drive system, one set of burst information is received from a disk sector, and that burst information is used to more accurately position read write head assembly 380 over the center of an accessed track as is known in the art. Such an approach leads to an increased position accuracy, but at times is susceptible to noise and other error sources. In contrast, disk drive system 300 includes a combination of motor controller 350 and multiple sector error correction circuit 355. In operation, read channel 330 detects each time burst information (i.e., burst 158) being accessed from disk platter 390. Multiple sector error correction circuit 355 is provided with an indication of the burst information as well as the detected burst information directly from preamp 360. Multiple sector error correction circuit 355 samples the received analog burst information using an analog to digital converter and stores the samples. Multiple sector error correction circuit 355 then awaits a subsequent indication of burst data from read channel 330 that occurs in relation to traversing a subsequent sector of disk platter 390. The preceding process of sampling the burst information is repeated resulting in a second set of burst samples derived from the subsequent sector. This second set of burst samples is phase aligned with the initial set of burst samples, and the aligned samples are then combined to create a composite of burst samples retrieved from two sectors. This composite of burst samples provides an indication of an error position of read/write head assembly 380 relative to the center of a given track. This position error information is similar to that derived from burst information in conventional disk drive systems, but is not as susceptible to errors due to the filtering function attributable to combining burst information from two sectors. It should be noted by one of ordinary skill in the art upon reading this disclosure that burst information from three or more sectors may be used to provide additional filtering in accordance with other embodiments of the present invention. Further, it will be noted by one of ordinary skill in the art based on reading this disclosure that a similar approach of using information derived from multiple sectors may be applied to data other than burst information. For example, it may be applied to receive gray codes from multiple sectors and thereby increase position confidence, or even to recurring information within the user data fields extending between the sectors.

Once the position error information is derived using burst information from multiple sectors, that position information is fed from multiple sector error correction circuit 355 to motor controller 350. Motor controller 350 causes read/write head assembly 380 to move a distance and direction corresponding to the derived position error. In this way, read/write head assembly 380 may be accurately positioned over the particular track. Such an approach reduces the susceptibility to noise and other errors when compared with conventional systems, and further offers a statistical increase in position accuracy when compared with conventional systems.

Figure 4:
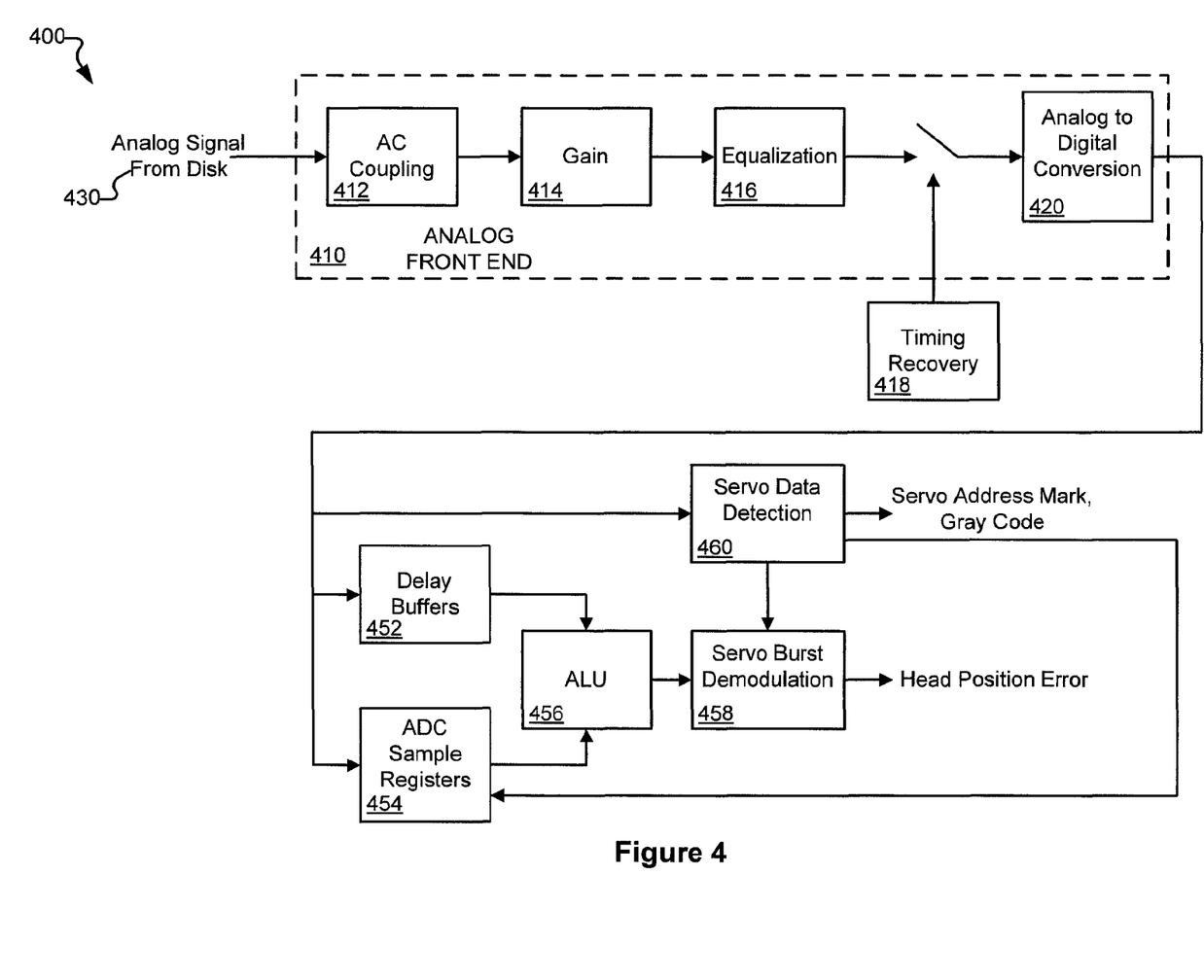
FIG. 4 depicts a head assembly positioning system in accordance with one or more embodiments of the present invention.

Turning to FIG. 4, a head assembly positioning system 400 in accordance with one or more embodiments of the present invention is depicted. Head assembly positioning system 400 includes an analog front end 410 that is responsible for detecting an analog signal 430 stored on a magnetic storage medium (not shown). Analog front end 410 may be any analog front end known in the art. As shown, analog front end 410 includes an AC coupling element 412. Where system 400 is implemented as part of a hard disk drive system, AC coupling 412 would be provided by a read/write head assembly. In addition, analog front end 410 includes a gain element 414 for amplifying the detected analog signal and an equalization element 416. Again, where system 400 is implemented as part of a hard disk drive system, gain 414 and equalization element 416 would be provided by a pre-amplifier circuit. Analog front end 410 also includes an analog to digital conversion element 420 that converts the amplified and equalized analog signal 430 to a digital output representative of analog circuit 430. Analog to digital conversion element 420 may be any analog to digital converter known in the art.

The sampling period of analog to digital conversion element is controlled by a timing recovery circuit 418 that may be, for example, a phase-locked loop circuit as is known in the art. Timing recovery circuit 418 is used to synchronize sampling of burst information coming from different sectors. It should be noted that sectors may include more than one set of burst information, and that averaging may include averaging multiple bursts within a sector and/or across sectors. Thus, for example, where the first burst is sampled at a phase exactly half way between adjacent zero crossings (i.e., the maximum amplitude of a sine wave), then the later sampled burst information is sampled at a corresponding phase. In this way, meaningful position error information may be derived from the burst information.

The digital data output from analog to digital conversion element 420 is provided to a servo data detection module 460, to a delay buffers 452 and to an ADC sample register set 454. ADC sample register set is configured to receive and store a portion of information provided from analog to digital conversion element 420, and delay buffers 452 are configured to receive and delay a portion of information provided from analog to digital conversion element 420. In some cases, the relevant portion of information provided from analog to digital conversion element 420 is the magnitude of the burst information as discussed above in relation to FIG. 3. The output of delay buffers 452 and ADC sample register set 454 (e.g., the first and second burst samples discussed above in relation to FIG. 3) are provided to an ALU 456 where they are combined using some form of an averaging function. The combination of the output of delay buffers 452 and ADC sample register set 454 is provided to a servo burst demodulation element 458. Servo burst demodulation element 458 may be a conventional demodulator known in the art and used for correlating a burst magnitude with a positional error. In turn, servo burst demodulation element 458 provides a head position error indicator to another function (not shown) associated with head assembly positioning system 400. For example, where head assembly positioning system 400 is associated with a hard disk drive system, servo burst demodulation element 458 may provide the head position error indicator to a motor controller that is operable to move a read/write head assembly nearer to a center point of a track being traversed.

Servo data detection module 460 is operable to identify sectors on a magnetic storage medium. In identifying the sectors, servo data detection module utilizes the preamble within the sector to determine that a sector has been found, and then identifies the servo address mark, gray code and burst within the particular sector as is known in the art. Servo data detection module 460 provides the servo address mark and the gray code to other processing functions (not shown) that are associated with head assembly positioning system 400. In addition, servo data detection module 460 provides an indication of burst information to ADC sample registers 454 and servo burst demodulation element 458.

In operation, when an initial burst is indicated by servo data detection module 460, ADC sample register set 454 registers the magnitude of the burst information provided by analog to digital conversion element. The subsequent burst information is delayed through delay buffers 452 to assure a proper alignment with the initial burst maintained in ADC sample register set 454. The delayed, subsequent burst information is combined with the output of ADC sample register set 454 by ALU 456. This combination may be, for example, an averaging function where the two numbers are added together and divided by two or an averaging function where the two numbers are simply added together. Based on the disclosure provided herein, one of ordinary skill in the art will recognize a variety of ways in which the two numbers may be combined to achieve the filtering function provided through the use of data from multiple sectors or other disk areas. Once the end of the burst is detected, the output of ALU 456 is latched by servo burst demodulation element 458. At this point, servo burst demodulation element 458 uses the combined output of ALU 456 to create a position error indicator.

Figure 5:
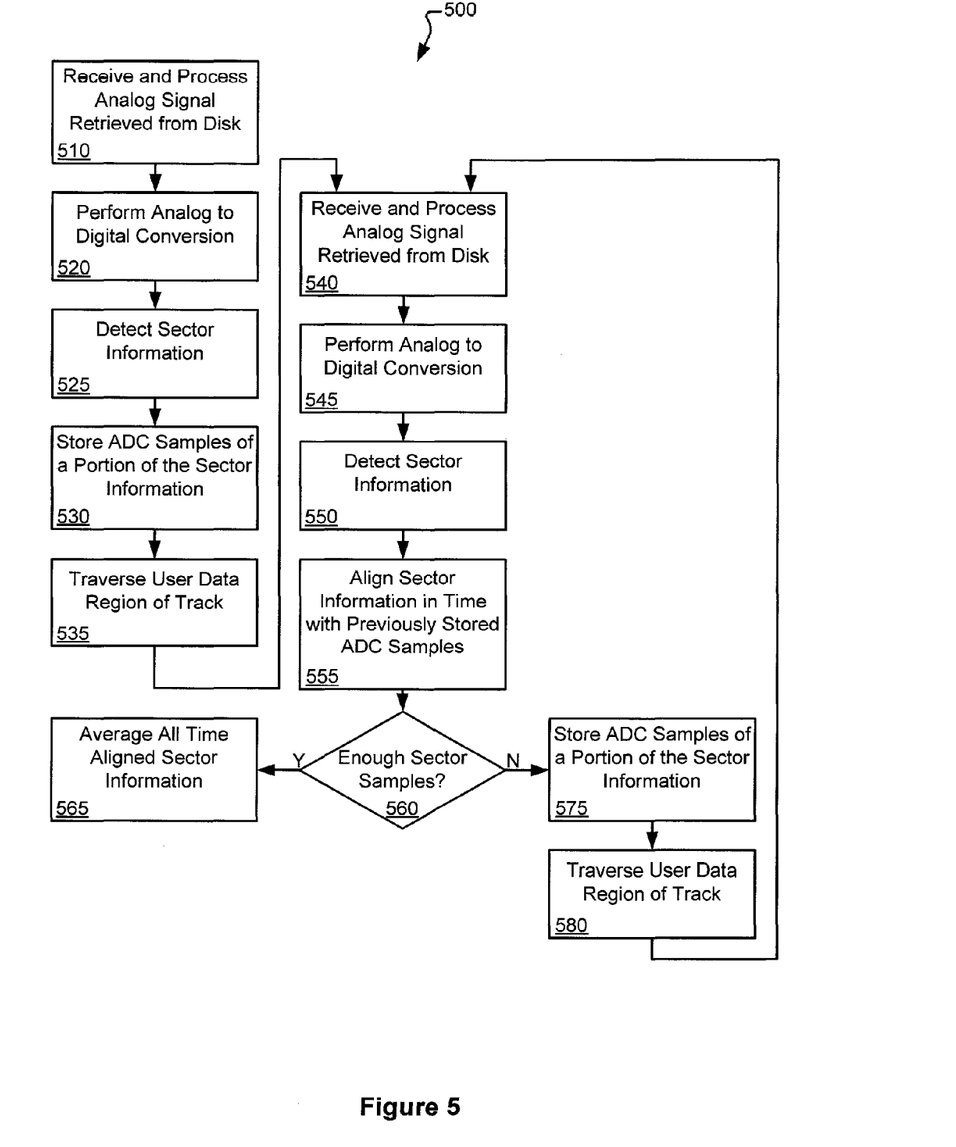
FIG. 5 is a flow diagram depicting a method in accordance with one or more embodiments of the present invention for positioning a read/write head assembly within a disk track.

Turning now to FIG. 5, a flow diagram 500 depicts a method in accordance with one or more embodiments of the present invention for positioning a read/write head assembly within a disk track. Following flow diagram 500, an analog signal is retrieved from a disk and processed (block 510). This process can include the known processes of forming an analog signal based on information magnetically stored on the disk, and amplifying the analog signal. An analog to digital conversion is performed on the amplified signal (block 520). The information received is queried for a preamble indicative of a sector (block 525). Once a sector is found, a portion of the sector information under test is identified and stored (block 530). Thus, for example, it may be that the gray code and/or servo address mark are being tested, or that some user data located in relation to the sector is being used as an alternative error check.

The read/write head continues traversing the magnetic storage medium including the user data portion of a track extending between sectors (block 535). During this process of accessing data from the disk, various user data is accessed and converted using an analog to digital converter (blocks 540, 545). At some point, the read/write head assembly begins traversing a subsequent sector which is identified by a preamble (block 550). Once the subsequent sector is found, the data under test (i.e., gray code, servo address mark and/or user data located in relation to the sector) is identified and aligned in time with the previously stored burst samples (block 555). Where the assertion level of the particular sample is the driving factor and the amplitude of the sample is less important, it may be possible to forgo the preceding alignment step.

It is then determined whether data from a sufficient number of sectors has been received (block 560). Thus, where a system is particular noisy, it may be desirable to average samples from three or more sectors to filter or otherwise average out any noise affecting any one burst amplitude signal. In such a case, the most recently received and aligned sample is stored (block 575), the subsequent user data portion is traversed (block 580) and the processes of blocks 540, 545, 550 and 555 are repeated to obtaining yet another sample of the data under test from a different location on the disk.

Once sufficient burst samples have been obtained (block 560), all of the received samples are averaged together (block 565). As previously discussed, by averaging two or more samples the effect of any noise or other error on any given sample is reduced. This process of averaging can be performed in any number of ways. For example, where the servo address marks are being used, two or more of the samples may be averaged by comparing to assure that the proper incrementing is seen for each of the samples. Thus, for example, three samples may be used and where two of the three samples show proper incrementing, and the third is improper, it may be assumed that the third sample is flawed due to noise or some other error source. Based on the disclosure provided herein, one of ordinary skill in the art will recognize a variety of approaches that may be used to average or otherwise filter time aligned information. The entire process of flow diagram 500 may be repeated each time read/write head assembly is repositioned relative to a magnetic storage medium.

Figure 6:
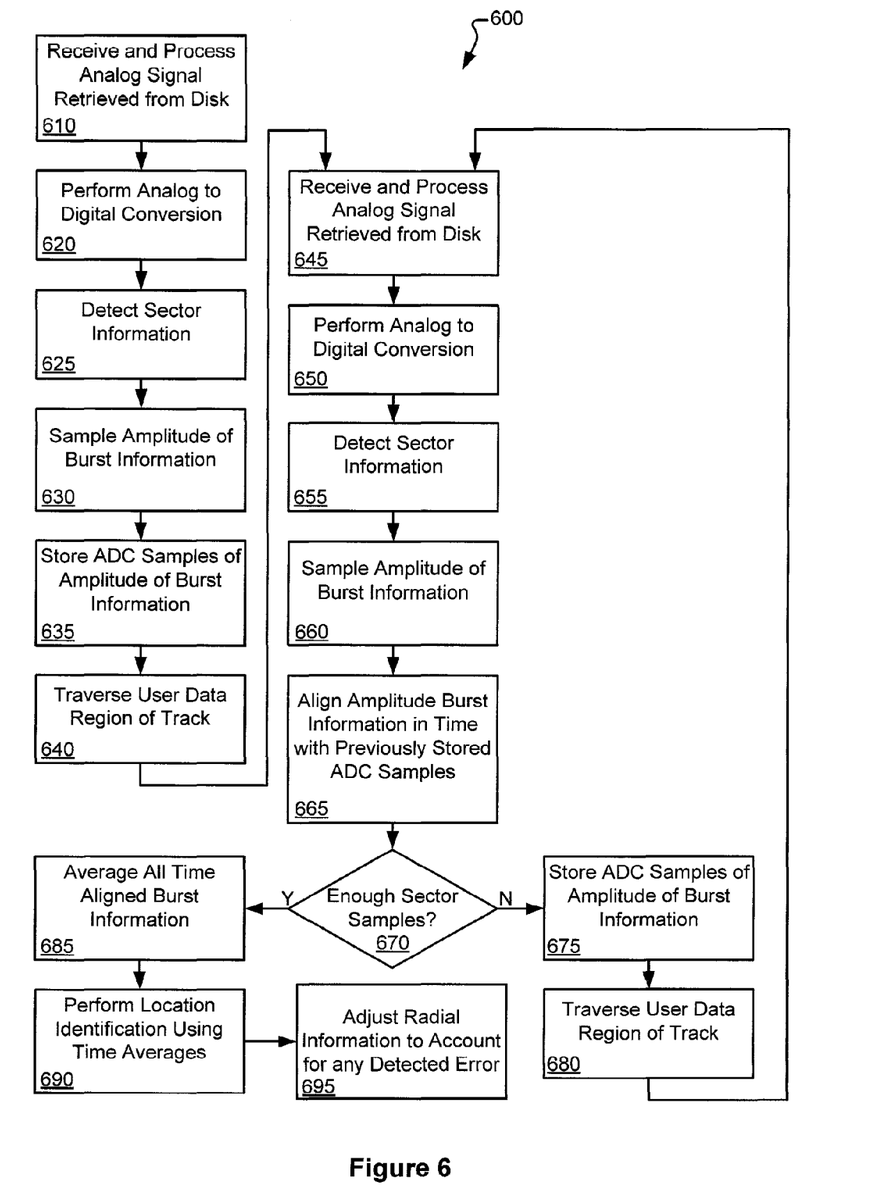
FIG. 6 is a flow diagram depicting another method in accordance with other embodiments of the present invention for positing a read/write head assembly within a disk track.

Turning now to FIG. 6, a flow diagram 600 depicts another method in accordance with other embodiments of the present invention for positing a read/write head assembly within a disk track. Following flow diagram 600, an analog signal is retrieved from a disk and processed (block 610). This process can include the known processes of forming an analog signal based on information magnetically stored on the disk, and amplifying the analog signal. An analog to digital conversion is performed on the amplified signal (block 620). The information received is queried for a preamble indicative of a sector (block 625). Once a sector is found, the magnitude of the burst information within the sector is sampled (block 630), and the sampled magnitude is stored (block 635). Again, as is known in the art, the magnitude of the burst information is indicative of a position error of the read/write head assembly relative to a given track.

The read/write head continues traversing the magnetic storage medium including the user data portion of a track extending between sectors (block 640). During this process of accessing data from the disk, various user data is accessed and converted using an analog to digital converter (blocks 645, 650). At some point, the read/write head assembly begins traversing a subsequent sector which is identified by a preamble (block 655). Once the subsequent sector is found, the magnitude of the samples of the burst information within the sector is identified (block 660). In addition, the newly received burst amplitude samples are aligned in time (i.e., the phases of the sine wave of the first sample set is aligned with the phase of the sine wave of the second sample set) with the previously stored burst samples (block 665). Because the burst samples include the amplitude of a sensed sine wave, the timing of the sample affects the sensed amplitude. Thus, the aforementioned alignment process moves one of the burst samples in time such that the sensed sine waves are in phase and correlating the sensed burst samples. Indeed, in a theoretical scenario where no errors such as noise errors are present on the sensed burst amplitudes, both the first burst amplitude and the second burst amplitude would be approximately equal after the alignment process is completed.

It is then determined whether data from a sufficient number of sectors has been received (block 670). Thus, where a system is particular noisy, it may be desirable to average samples from three or more sectors to filter or otherwise average out any noise affecting any one burst amplitude signal. In such a case, the most recently received and aligned burst amplitude sample is stored (block 675), the subsequent user data portion is traversed (block 880) and the processes of blocks 645, 650, 655, 660 and 665 are repeated to obtaining yet another burst amplitude sample.

Once sufficient burst samples have been obtained (block 670), all of the receive samples are averaged together (block 685). As previously discussed, by averaging two or more samples the effect of any noise or other error on any given sample is reduced. This process of averaging can be performed in any number of ways. For example, all of the samples can be added together and divided by the total number of samples used. Alternatively, all of the samples can be added together without a subsequent division process. In this case, the added samples will be treated differently from a single sample approach for outputting a position error as the number will be statistically larger than a single sample. As yet another example, where two samples are detected, one of the samples may be subtracted from the other, and half of the difference added back to the smaller sample. Based on the disclosure provided herein, one of ordinary skill in the art will recognize a variety of approaches that may be used to average time aligned sector information. Once the averaging is complete, the output of the averaging may be formatted as a position error signal suitable as a feedback signal for a motor controller (block 690). This signal causes the motor controller to move the read/write head assembly a distance and direction designed to reduce or eliminate any position error (block 695). The entire process of flow diagram 600 may be repeated each time read/write head assembly is repositioned relative to a magnetic storage medium.

In conclusion, the present invention provides novel systems, devices, methods and arrangements for determining location and/or correcting location. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for governing position of a read/write head assembly in relation to a magnetic storage medium, the system comprising:
    an interface circuit, wherein the interface circuit is operable to receive an information stream retrieved from a magnetic storage medium, and wherein the magnetic storage medium includes at least one track with at least a first sector and a second sector; and
    a multiple sector error detection circuit, wherein the multiple sector error detection circuit is operable to receive a first sample of a portion of the first sector and a second sample of a portion of the second sector via the interface circuit, and wherein the multiple sector error detection circuit is operable to average the first sample directly with the second sample to create an indication of a head assembly location relative to the magnetic storage medium.

2. The system of claim 1, wherein the system further comprises:
    a motor controller, wherein the motor controller is operable to receive the indication of the head assembly location relative to the magnetic storage medium; and to cause the head assembly to move relative to the magnetic storage medium an amount based at least in part on the indication of the head assembly location relative to the magnetic storage medium.

3. The system of claim 1, wherein the indication of the head assembly location relative to the magnetic storage medium is an indication of an error distance from a desired location, and wherein the system further comprises:
    a motor controller, wherein the motor controller is operable to receive the indication of the head assembly location relative to the magnetic storage medium; and to cause the head assembly to move relative to the magnetic storage medium an amount designed to reduce the error distance.

4. The system of claim 1, wherein the first sector includes a first burst, wherein the second sector includes a second burst, wherein the portion of the first sector corresponds to the first burst and the portion of the second sector corresponds to the second burst, and wherein the multiple sector error detection circuit is operable to determine a first amplitude of the first sample and a second amplitude of the second sample.

5. The system of claim 4, wherein the multiple sector error detection circuit is further operable to align the phase of the first sample with the phase of the second sample.

6. The system of claim 1, wherein the first sample is directly summed with the second sample prior to determining a position error.

7. The system of claim 1, wherein the first sector includes a first preamble, a first gray code and a first sync; wherein the second sector includes a second preamble, a second gray code and a second sync; wherein receiving information from the interface circuit representing at least the first sector and the second sector includes receiving the first sample from one of the first preamble, the first gray code or the first sync, and the second sample from one of the second preamble, the second gray code or second sync; and wherein the multiple sector detector circuit is operable to determine a first amplitude of the first sample and a second amplitude of the second sample.

8. The system of claim 7, wherein averaging the first sample directly with the second sample includes summing the first amplitude directly with the second amplitude.

9. The system of claim 1, wherein the first sector immediately precedes the second sector on the magnetic storage medium.

10. A head location feedback device, the device comprising:
    an interface circuit, wherein the interface circuit is operable to receive an information stream retrieved from a magnetic storage medium, wherein the magnetic storage medium includes at least one track with at least a first sector and a second sector associated with the track, and wherein the information stream includes a first burst obtained from the first sector and a second burst obtained from the second sector; and
    a multiple sector error detection circuit, wherein the multiple sector error correction circuit is operable to:
        phase align the first burst with the second burst;
        determine a first amplitude of the first burst;
        determine a second amplitude of the second burst; and
        directly sum the amplitude of the first burst with the amplitude of the second burst, wherein the sum of the amplitude of the first burst and the amplitude of the second burst corresponds to a position error of a head assembly relative to the magnetic storage medium.

11. The device of claim 10, wherein the device further includes:
    a motor controller, wherein the motor controller is operable to receive the combination of the amplitude of the first burst and the amplitude of the second burst and to cause the head assembly to move relative to the magnetic storage medium by an amount corresponding to the position error.

12. A method for positioning a read/write head assembly in relation to a magnetic storage medium, the method comprising:
    providing a magnetic storage medium, wherein the magnetic storage medium includes at a first sector and a second sector, and wherein the first sector is an even sector and the second sector is an odd sector;
    identifying the first sector;
    sampling the first sector to create a first sample;
    identifying the second sector;
    sampling the second sector to create a second sample;
    directly summing the first sample with the second sample to create a sum; and
    determining an average of samples used to create the sum to yield an indication of a location of the read/write head assembly relative to the magnetic storage medium.

13. The method of claim 12, wherein the first sample is directly summed with the second sample prior to determining a position error.

14. The method of claim 12, wherein the first sector includes a first preamble, a first gray code and a first sync; wherein the second sector includes a second preamble, a second gray code and a second sync; wherein receiving information from the interface circuit representing at least the first sector and the second sector includes receiving a first sample from one of the first preamble, the first gray code or the first sync, and a second sample from one of the second preamble, the second gray code or second sync; and wherein the multiple sector detector circuit is operable to determine a first amplitude of the first sample and a second amplitude of the second sample.

15. The method of claim 12, wherein the first sector immediately precedes the second sector on the magnetic storage medium.

16. The method of claim 12, wherein the method further includes:
  moving the read/write head assembly a distance and direction corresponding to the indication of the location.

17. The method of claim 12, wherein the first sector includes a preamble and a sync, and wherein identifying the first sector includes detecting at least one of the preamble and the sync.

18. The method of claim 12, wherein the first sector includes a first burst, wherein sampling the first sector includes sampling an amplitude of the first burst, wherein the second sector includes a second burst, and wherein sampling the second sector includes sampling an amplitude of the second burst.

19. The method of claim 12, wherein the first sector includes a first gray code, wherein the second sector includes a second gray code, wherein sampling the first sector includes sampling the first gray code, and wherein sampling the second sector includes sampling the second gray code.

20. The method of claim 19, wherein the first gray code and the second gray code are the same code.

21. The method of claim 12, wherein the magnetic storage medium further includes at least a third sector associated with the track, and wherein the method further comprises:
  identifying the third sector;
  sampling the third sector to create a third signal; and
  directly aggregating the sum with the third signal, wherein the average includes at least the first signal, the second signal and the third signal.

* * * * *